(12) United States Patent
Chichak

(10) Patent No.: US 11,345,846 B2
(45) Date of Patent: May 31, 2022

(54) ALKYLPHENOL COPOLYMER

(71) Applicant: SI Group, Inc., Schenectady, NY (US)

(72) Inventor: Kelly S. Chichak, Halfmoon, NY (US)

(73) Assignee: SI Group, Inc., Schenectady, NY (US)

( * ) Notice: Subject to any disclaimer, the term of this patent is extended or adjusted under 35 U.S.C. 154(b) by 0 days.

(21) Appl. No.: 16/919,275

(22) Filed: Jul. 2, 2020

(65) Prior Publication Data

US 2021/0002539 A1 Jan. 7, 2021

Related U.S. Application Data

(60) Provisional application No. 62/870,186, filed on Jul. 3, 2019.

(51) Int. Cl.
| | | |
|---|---|---|
| C09K 8/524 | (2006.01) | |
| C08L 65/02 | (2006.01) | |
| C08G 8/10 | (2006.01) | |

(52) U.S. Cl.
CPC ............ *C09K 8/524* (2013.01); *C08G 8/10* (2013.01); *C08L 65/02* (2013.01)

(58) Field of Classification Search
CPC ........... C09K 8/524; C09K 8/10; C08L 65/02; C08L 9/00; C08L 61/06; C08L 21/00; C08L 2666/16; C08J 3/11; C08J 5/24; C08J 2361/06; C08G 8/10; C08G 8/04; C08G 14/02; C08G 14/04; C08K 5/09
See application file for complete search history.

(56) References Cited

U.S. PATENT DOCUMENTS

| | | | |
|---|---|---|---|
| 3,364,250 | A | 1/1968 | Dexter et al. |
| 3,663,256 | A | 5/1972 | Miller et al. |
| 3,888,944 | A | 6/1975 | Crescentini et al. |
| 4,259,464 | A | 3/1981 | Burikds et al. |
| 4,271,059 | A * | 6/1981 | Asano .................. B41M 5/155 524/611 |
| 4,434,265 | A | 2/1984 | Chasar |
| 4,617,336 | A | 10/1986 | Pastor et al. |
| 4,748,099 | A | 5/1988 | Shimada et al. |
| 4,785,107 | A | 11/1988 | Hedwig et al. |
| 5,089,656 | A | 2/1992 | Yu |
| 5,206,414 | A | 4/1993 | Evans et al. |
| 5,264,612 | A | 11/1993 | Evain et al. |
| 5,393,648 | A | 2/1995 | Toda et al. |
| 5,571,506 | A | 11/1996 | Regan et al. |
| 5,658,865 | A | 8/1997 | Yoshida et al. |
| 5,713,966 | A | 2/1998 | Cherpeck |
| 5,892,097 | A | 4/1999 | Ross et al. |
| 6,559,105 | B2 | 5/2003 | Abraham et al. |
| 7,667,066 | B2 | 2/2010 | Gatto et al. |
| 7,713,315 | B2 | 5/2010 | Krull et al. |
| 8,123,930 | B2 | 2/2012 | Cohrs et al. |
| 2006/0183935 | A1 | 8/2006 | Carter et al. |
| 2006/0217274 | A1 | 9/2006 | Brown et al. |
| 2008/0050668 | A1 | 2/2008 | Chung et al. |
| 2011/0151372 | A1 | 6/2011 | Watanabe et al. |
| 2020/0017790 | A1 | 1/2020 | Weers |

FOREIGN PATENT DOCUMENTS

| | | |
|---|---|---|
| CN | 1077877 | 1/2002 |
| CN | 107011149 | 8/2017 |
| EP | 0421928 | 4/1991 |
| EP | 1453786 | 1/2010 |
| JP | S54104835 | 8/1979 |
| JP | S63227542 | 9/1988 |
| JP | H01258678 | 10/1989 |

OTHER PUBLICATIONS

Gross et al., "Biodegradable Polymers for the Environment," Science, vol. 297, Aug. 2, 2002, 803-807.
International Search Report for PCT/US2020040653 dated Oct. 22, 2020, 6 pages.
Kelland, "Production Chemicals for the Oil and Gas Industry," Second Edition, 10 pages.
Mueller, "Biological degradation of synthetic polyesters—Enzymes as potential catalysts for polyester recycling," Process Biochemistry 41 (2006) 2124-2128.
Okada, "Chemical syntheses of biodegradable polymers," Progress in Polymer Science 27, 2002, 87-133.
Written Opinion for PCT/US2020040653 dated Oct. 22, 2020, 10 pages.

\* cited by examiner

*Primary Examiner* — Shane Fang
(74) *Attorney, Agent, or Firm* — Dority & Manning, P.A.

(57) ABSTRACT

An alkylphenol copolymer, such as for use in a petroleum composition, is provided. The alkylphenol copolymer has at least the following repeating unit (I):

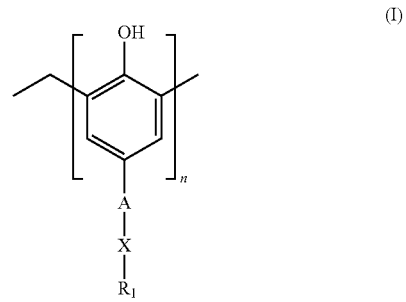

wherein:
A is a direct bond or an alkylene;
X is —C(O)O—, —OC(O)—, —C(O)N($R_6$)—, —N($R_6$)C(O)—, —C(O)—, —N($R_6$)—, —O—, or —S—;
$R_6$ is H or an alkyl;
$R_1$ includes a $C_1$-$C_{80}$ alkyl, a $C_2$-$C_{20}$ alkenyl, a $C_2$-$C_{20}$ alkynyl, a $C_3$-$C_{12}$ aryl, or a polyether; and
n is an integer from 1 to 200.
The present invention also provides a method for forming the alkylphenol copolymer containing the aforementioned repeating unit (I) as well as a method for forming a monomer for forming repeating unit (I).

22 Claims, No Drawings

ALKYLPHENOL COPOLYMER

CROSS-REFERENCE TO RELATED APPLICATION

The present application claims filing benefit of U.S. Provisional Patent Application Ser. No. 62/870,186 having a filing date of Jul. 3, 2019, which is incorporated herein by reference in its entirety.

BACKGROUND OF THE INVENTION

Various additives are traditionally employed during oil production to modify the flow properties of a petroleum source or to inhibit the deposition of certain undesirable byproducts onto surfaces. For example, paraffin inhibitors, asphaltene dispersants, and scale inhibitors may be selectively injected into wells or flowlines to treat a petroleum source and prevent or control the effects of precipitation of paraffins, asphaltenes, and mineral scale. These additives can also be used at other points of the oil production cycle, such as during transportation or storage to limit the deposition of solids on the surface of pipes, storage vessels, and transportation vessels (rail cars, ocean tankers, etc.). Unfortunately, because most conventional additives have limited functionality, operators typically need to add multiple different additives to a petroleum source during a production cycle. For example, one additive might be required to disperse or inhibit the crystallization or surface deposition of paraffin waxes, while a completely separate additive might be required to help disperse or inhibit the precipitation of asphaltenes within the petroleum source or deposition of asphaltenes on contacted surfaces. As such, a need continues to exist for an additive that is capable of exhibiting a broad spectrum of benefits, particularly when added to a petroleum source.

SUMMARY OF THE INVENTION

In accordance with one embodiment of the present invention, an alkylphenol copolymer is disclosed wherein the copolymer has the following repeating units (I) and (II):

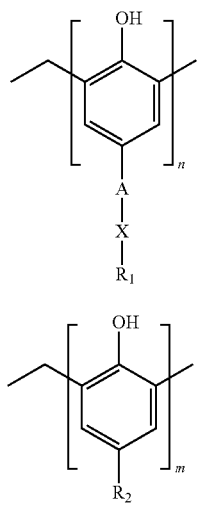

wherein:
A is a direct bond or an alkylene;
X is —C(O)O—, —OC(O)—, —C(O)N($R_6$)—, —N($R_6$)C(O)—, —C(O)—, —N($R_6$)—, —O—, or —S—;
$R_6$ is H or an alkyl;
$R_1$ includes a $C_1$-$C_{80}$ alkyl, a $C_2$-$C_{20}$ alkenyl, a $C_2$-$C_{20}$ alkynyl, a $C_3$-$C_{12}$ aryl, or a polyether;
$R_2$ is a $C_1$-$C_{80}$ alkyl;
n is an integer from 1 to 200; and
m is an integer from 1 to 400.

In accordance with another embodiment of the present invention, a paraffin inhibitor composition is disclosed comprising the alkylphenol copolymer as described above.

In accordance with another embodiment of the present invention, an asphaltene dispersant composition is disclosed comprising the alkylphenol copolymer as described above.

In accordance with another embodiment of the present invention, a method for modifying a petroleum source is disclosed that comprises adding an alkylphenol copolymer as described above to a petroleum source.

In accordance with another embodiment of the present invention, a petroleum composition is disclosed that comprises a petroleum source and an alkylphenol copolymer as described above.

In accordance with one embodiment of the present invention, a paraffin inhibitor composition and/or asphaltene dispersant composition is disclosed wherein the composition comprises an alkylphenol copolymer comprising the following repeating unit (I):

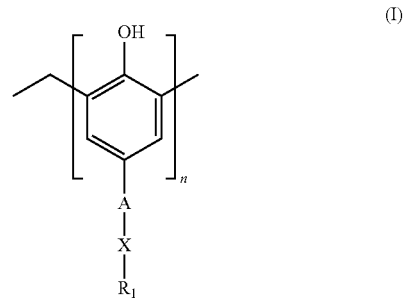

wherein:
A is a direct bond or an alkylene;
X is —C(O)O—, —OC(O)—, —C(O)N($R_6$)—, —N($R_6$)C(O)—, —C(O)—, —N($R_6$)—, —O—, or —S—;
$R_6$ is H or an alkyl;
$R_1$ includes a $C_1$-$C_{80}$ alkyl, a $C_2$-$C_{20}$ alkenyl, a $C_2$-$C_{20}$ alkynyl, a $C_3$-$C_{12}$ aryl, or a polyether; and
n is an integer from 1 to 200.

In accordance with another embodiment of the present invention, a method for modifying a petroleum source is disclosed that comprises adding a paraffin inhibitor composition and/or asphaltene dispersant composition as described above to a petroleum source.

In accordance with another embodiment of the present invention, a petroleum composition is disclosed that comprises a petroleum source and a paraffin inhibitor composition and/or asphaltene dispersant composition as described above.

In accordance with another embodiment of the present invention, a method for forming a monomer for forming aforementioned repeating unit (I) comprises reacting a compound (VI) having the following structure:

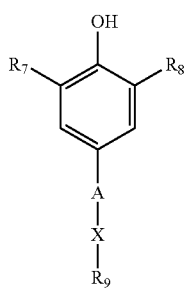

(VI)

wherein:
A is a direct bond or an alkylene;
X is —C(O)O—, —OC(O)—, —C(O)N(R$_6$)—, —N(R$_6$)C(O)—, —C(O)—, —N(R$_6$)—, —O—, or —S—;
R$_6$ is H or an alkyl;
R$_7$ and R$_8$ are each independently hydrogen or a C$_1$-C$_{10}$ alkyl; and
R$_9$ is hydrogen or a C$_1$-C$_5$ alkyl,
with a compound (VII) having a hydroxyl moiety.

In accordance with another embodiment of the present invention, a method for forming the aforementioned alkylphenol comprising repeating unit (I) and repeating unit (II) comprises polymerizing compound (VIII), compound (IX), and a formaldehyde source, wherein compound (VIII) and compound (IX) have the following structure:

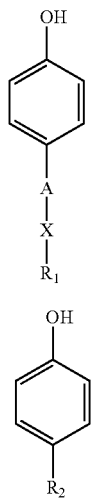

(VIII)

(IX)

wherein:
A is a direct bond or an alkylene;
X is —C(O)O—, —OC(O)—, —C(O)N(R$_6$)—, —N(R$_6$)C(O)—, —C(O)—, —N(R$_6$)—, —O—, or —S—;
R$_6$ is H or an alkyl;
R$_1$ includes a C$_1$-C$_{80}$ alkyl, a C$_2$-C$_{20}$ alkenyl, a C$_2$-C$_{20}$ alkynyl, a C$_3$-C$_{12}$ aryl, or a polyether; and
R$_2$ is a C$_1$-C$_{80}$ alkyl.

Other features and aspects of the present invention are set forth in greater detail below.

Definitions

It is to be understood that the terminology used herein is for the purpose of describing particular embodiments only and is not intended to limit the scope of the present invention.

"Alkyl" refers to straight chain, branched chain, or cyclic monovalent saturated aliphatic hydrocarbyl groups and "C$_q$-C$_r$ alkyl" refers to alkyl groups having from q to r carbon atoms. This term includes, by way of example, straight chain, branched chain, or cyclic hydrocarbyl groups, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosanyl, henicosanyl, docosanyl, tricosanyl, tetracosanyl, pentacosanyl, hexacosanyl, heptacosanyl, octacosanyl, and the like.

"Alkylene" refers to a straight chain or branched chain divalent hydrocarbyl. For example, "C$_q$-C$_r$ alkylene" refers to an alkylene group having from q to r carbon atoms. This term includes, by way of example, straight chain or branched chain hydrocarbyl groups, such as methylene, ethylene, propylene (e.g., n-propylene), butylene (e.g., n-butylene), and the like.

"Alkenyl" refers to a straight chain or branched chain monovalent aliphatic hydrocarbyl group having at least 1 site of vinyl unsaturation (>C=C<). For example, "C$_q$-C$_r$ alkenyl" refers to alkenyl groups having from q to r carbon atoms. This term includes, by way of example, straight chain or branched chain hydrocarbyl groups, such as ethenyl, propenyl, 1,3-butadienyl, and the like.

"Alkynyl" refers to a straight chain or branched chain monovalent aliphatic hydrocarbyl group having at least one carbon triple bond. The term "alkynyl" is also meant to include those hydrocarbyl groups having one triple bond and one double bond. For example, "C$_q$-C$_r$ alkynyl" refers to alkynyl groups having from q to r carbon atoms. This term includes, by way of example, straight chain or branched chain hydrocarbyl groups, such as ethynyl, propynyl, and the like.

"Aryl" refers to an aromatic hydrocarbyl group. For example, "C$_q$-C$_r$ aryl" refers to aryl groups having from q to r carbon atoms. This term includes, by way of example, linear and branched hydrocarbyl groups, such as phenyl, naphthyl, indenyl, azulenyl, fluorenyl, anthracenyl, phenanthrenyl, tetrahydronaphthyl, indanyl, phenanthridinyl and the like.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to an alkylphenol copolymer that can exhibit a broad spectrum of benefits, particularly when used to modify a petroleum source. Namely, by selectively controlling various aspects of the alkylphenol copolymer, such as the type and/or relative molar concentrations of the monomers, the present inventors have discovered that the resulting copolymer can be tailored to provide a wide variety of beneficial properties to a petroleum composition. For example, the alkylphenol copolymer can function as a viscosity modifier, asphaltene dispersant, paraffin inhibitor, scale deposition inhibitor, corrosion inhibitor, and/or pour point depressant, etc. The present inventors have also discovered that the copolymer can be "multi-functional" in that it exhibits two or more beneficial functions (e.g., asphaltene dispersant, paraffin inhibition, and/or viscosity modifier) when used with a petroleum source. This can reduce costs and simplify operations as it allows a single material to accomplish multiple functions rather than requiring the use of two or more separate materials.

The alkylphenol copolymer of the present invention generally has the following repeating units (I) and (II):

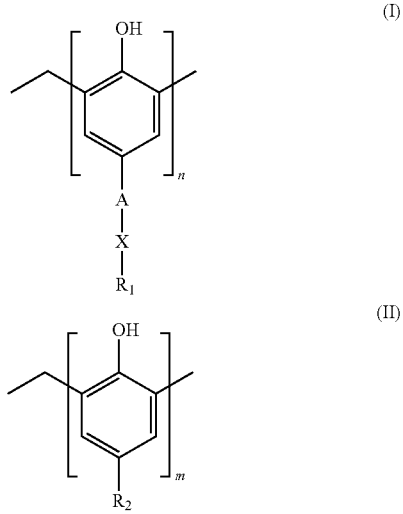

wherein:

A is a direct bond or an alkylene;

X is —C(O)O—, —OC(O)—, —C(O)N($R_6$)—, —N($R_6$)C(O)—, —C(O)—, —N($R_6$)—, —O—, or —S—;

$R_6$ is H or an alkyl;

$R_1$ includes a $C_1$-$C_{80}$ alkyl, a $C_2$-$C_{20}$ alkenyl, a $C_2$-$C_{20}$ alkynyl, a $C_3$-$C_{12}$ aryl, or a polyether;

$R_2$ is a $C_1$-$C_{80}$ alkyl;

n is an integer from 1 to 200; and m is an integer from 1 to 400.

As indicated above, "A" is a direct bond or an alkylene. In one embodiment, "A" is a direct bond such that the carbon in the ring is bonded directly to "X." In another embodiment, "A" is an alkylene (i.e., an alkylene bridge) bonded to the carbon in the ring and "X." For instance, the alkylene may be a $C_1$-$C_8$ alkylene, such as a $C_1$-$C_5$ alkylene, such as a $C_1$-$C_3$ alkylene, such as a $C_1$-$C_2$ alkylene or a $C_2$-$C_3$ alkylene. For instance, the alkylene may be a methylene, an ethylene, a propylene, a butylene, etc. In one embodiment, the alkylene may be a methylene. In another embodiment, the alkylene may be an ethylene. In a further embodiment, the alkylene may be a propylene. In an even further embodiment, the alkylene may be a butylene. Also, it should be understood that, in one embodiment, the alkylene may be a substituted alkylene wherein the substitution may comprise a $C_1$-$C_{20}$ alkyl, such as a $C_1$-$C_{15}$ alkyl, such as a $C_1$-$C_{10}$ alkyl, such as a $C_1$-$C_8$ alkyl, such as a $C_1$-$C_4$ alkyl.

As indicated above, "X" is —C(O)O—, —OC(O)—, —C(O)N($R_6$)—, —N($R_6$)C(O)—, —C(O)—, —N($R_6$)—, —O—, or —S—. For instance, "X" may be —C(O)O—, —OC(O)—, —C(O)N($R_6$)—, —N($R_6$)C(O)—, or —C(O)—. In particular, "X" may be —C(O)O— or —OC(O)—. In this regard, in one embodiment, "X" is —C(O)O—. In another embodiment, "X" is —OC(O)—. In a further embodiment, "X" is —C(O)N($R_6$)—. In an even further embodiment, "X" is —N($R_6$)C(O)—. In another embodiment, "X" is —C(O)—. In a further embodiment, "X" is —O—. In one embodiment, "X" is —S—.

As indicated above, in one embodiment, "X" may be —C(O)N($R_6$)—, —N($R_6$)C(O)—, or —N($R_6$)—. In this regard, as also indicated above, $R_6$ is H or an alkyl. In one embodiment, $R_6$ is H. In another embodiment, $R_6$ is an alkyl. For instance, the $R_6$ alkyl may be a $C_1$-$C_{30}$ alkyl, such as a $C_1$-$C_{26}$ alkyl, such as a $C_1$-$C_{20}$ alkyl, such as a $C_1$-$C_{14}$ alkyl, such as a $C_1$-$C_{10}$ alkyl, such as a $C_1$-$C_4$ alkyl, such as a $C_1$-$C_3$ alkyl, such as a $C_1$-$C_2$ alkyl. For instance, the $R_6$ alkyl may have 1 or more, such as 2 or more, such as 3 or more, such as 5 or more, such as 10 or more carbon atoms. The $R_6$ alkyl may have 30 or less, such as 24 or less, such as 20 or less, such as 18 or less, such as 12 or less, such as 8 or less, such as 6 or less, such as 4 or less, such as 3 or less, such as 2 or less carbon atoms. In addition, the $R_6$ alkyl may be a straight chain, a branched chain, or cyclic. In one embodiment, the $R_6$ alkyl is a straight chain. In another embodiment, the $R_6$ alkyl is a branched chain. In a further embodiment, the $R_6$ alkyl is cyclic.

As indicated above, $R_1$ includes a $C_1$-$C_{80}$ alkyl, a $C_2$-$C_{20}$ alkenyl, a $C_2$-$C_{20}$ alkynyl, a $C_3$-$C_{12}$ aryl, or a polyether. In one embodiment, $R_1$ includes a $C_1$-$C_{80}$ alkyl. In another embodiment, $R_1$ includes a $C_2$-$C_{20}$ alkenyl. In a further embodiment, $R_1$ includes a $C_2$-$C_{20}$ alkynyl. In an even further embodiment, $R_1$ includes a $C_3$-$C_{12}$ aryl. In another embodiment, $R_1$ includes a polyether.

As indicated above, in one embodiment, $R_1$ includes a $C_1$-$C_{80}$ alkyl. In this regard, the $R_1$ alkyl may be a $C_1$-$C_{80}$ alkyl, such as a $C_3$-$C_{80}$ alkyl, such as a $C_4$-$C_{70}$ alkyl, such as a $C_5$-$C_{60}$ alkyl, such as a $C_6$-$C_{50}$ alkyl, such as a $C_8$-$C_{40}$ alkyl, such as a $C_{10}$-$C_{30}$ alkyl, such as a $C_{12}$-$C_{26}$ alkyl, such as a $C_{14}$-$C_{24}$ alkyl, such as a $C_{16}$-$C_{22}$ alkyl. In addition, the $R_1$ alkyl may be a $C_1$-$C_{80}$ alkyl, such as a $C_{10}$-$C_{80}$ alkyl, such as a $C_{20}$-$C_{80}$ alkyl, such as a $C_{30}$-$C_{80}$ alkyl. For instance, the $R_1$ alkyl may have 1 or more, such as 2 or more, such as 3 or more, such as 4 or more, such as 5 or more, such as 6 or more, such as 8 or more, such as 10 or more, such as 11 or more, such as 12 or more, such as 14 or more, such as 16 or more, such as 18 or more, such as 20 or more, such as 24 or more carbon atoms. The $R_1$ alkyl may have 80 or less, such as 70 or less, such as 60 or less, such as 50 or less, such as 40 or less, such as 30 or less, such as 26 or less, such as 24 or less, such as 20 or less, such as 18 or less, such as 16 or less carbon atoms. In addition, the $R_1$ alkyl may be a straight chain, a branched chain, or cyclic. In one embodiment, the $R_1$ alkyl is a straight chain. In another embodiment, the $R_1$ alkyl is a branched chain. In a further embodiment, the $R_1$ alkyl is cyclic.

As indicated above, in one embodiment, $R_1$ may be a branched chain alkyl. In this regard, the $R_1$ alkyl may be provided by reacting a Guerbet alcohol with the monomer precursor (i.e., the dialkyphenol or the deprotected dialkyphenol). As generally known in the art, Guerbet alcohols are saturated primary alcohols with branching of the carbon chain. In this regard, such alcohols may be described as 2-alkyl-1-alkanols. Without being limited, these alcohols may yield 2-butyl hexyl, 2-butyl octyl, 2-butyl decyl, 2-butyl dodecyl, 2-butyl tetradecyl, 2-butyl hexadecyl, 2-butyl octadecyl, 2-hexyl octyl, 2-hexyl decyl, 2-hexyl dodecyl, 2-hexyl tetradecyl, 2-hexyl hexadecyl, 2-hexyl octadecyl, 2-octyl hexyl, 2-octyl decyl, 2-octyl dodecyl, 2-octyl tetradecyl, 2-octyl hexadecyl, 2-octyl octadecyl, 2-decyl hexyl, 2-decyl octyl, 2-decyl dodecyl, 2-decyl tetradecyl, 2-decyl hexadecyl, 2-decyl octadecyl, 2-dodecyl hexyl, 2-dodecyl octyl, 2-dodecyl decyl, 2-dodecyl tetradecyl, 2-dodecyl hexadecyl, 2-dodecyl octadecyl, 2-tetradecyl hexyl, 2-tetradecyl octyl, 2-tetradecyl decyl, 2-tetradecyl dodecyl, 2-tetradecyl hexadecyl, and 2-tetradecyl octadecyl.

As indicated above, in one embodiment, $R_1$ includes a $C_2$-$C_{20}$ alkenyl. In this regard, the $R_1$ alkenyl may be a $C_2$-$C_{20}$ alkenyl, such as a $C_4$-$C_{20}$ alkenyl, such as a $C_6$-$C_{20}$ alkenyl, such as a $C_{10}$-$C_{20}$ alkenyl, such as a $C_{12}$-$C_{20}$ alkenyl, such as a $C_{14}$-$C_{20}$ alkenyl, such as a $C_{14}$-$C_{18}$ alkenyl. For instance, the $R_1$ alkenyl may have 2 or more, such as 3 or more, such as 4 or more, such as 5 or more, such as 6 or more, such as 8 or more, such as 10 or more, such as 12 or more, such as 14 or more, such as 16 or more carbon atoms. The $R_1$ alkenyl may have 20 or less, such as 18 or less, such as 16 or less carbon atoms, such as 14 or less, such as 12 or less, such as 10 or less, such as 8 or less, such as 6 or less carbon atoms. In addition, the $R_1$ alkenyl may be a straight chain or a branched chain. In one embodiment, the $R_1$ alkenyl is a straight chain. In another embodiment, the $R_1$ alkenyl is a branched chain.

As indicated above, in one embodiment, $R_1$ includes a $C_2$-$C_{20}$ alkynyl. In this regard, the $R_1$ alkynyl may be a $C_2$-$C_{20}$ alkynyl, such as a $C_4$-$C_{20}$ alkynyl, such as a $C_6$-$C_{20}$ alkynyl, such as a $C_{10}$-$C_{20}$ alkynyl, such as a $C_{12}$-$C_{20}$ alkynyl, such as a $C_{14}$-$C_{20}$ alkynyl, such as a $C_{14}$-$C_{18}$ alkynyl. For instance, the $R_1$ alkynyl may have 2 or more, such as 3 or more, such as 4 or more, such as 5 or more, such as 6 or more, such as 8 or more, such as 10 or more, such as 12 or more, such as 14 or more, such as 16 or more carbon atoms. The $R_1$ alkynyl may have 20 or less, such as 18 or less, such as 16 or less carbon atoms, such as 14 or less, such as 12 or less, such as 10 or less, such as 8 or less, such as 6 or less carbon atoms. In addition, the $R_1$ alkynyl may be a straight chain or a branched chain. In one embodiment, the $R_1$ alkynyl is a straight chain. In another embodiment, the $R_1$ alkynyl is a branched chain.

As indicated above, in one embodiment, $R_1$ includes a $C_3$-$C_{12}$ aryl. In this regard, the $R_1$ aryl may be a $C_3$-$C_{12}$ aryl, such as a $C_4$-$C_{12}$ aryl, such as a $C_6$-$C_{12}$ aryl, such as a $C_6$-$C_{10}$ aryl, such as a $C_6$—$C$ aryl. For instance, the $R_1$ aryl may have 3 or more, such as 4 or more, such as 5 or more, such as 6 or more carbon atoms. The $R_1$ aryl may have 12 or less, such as 10 or less, such as 8 or less, such as 7 or less, such as 6 or less, such as 5 or less carbon atoms. In addition, in one embodiment, the $R_1$ aryl may be polycyclic. The polycyclic aryl may include fused, bridged, and spiro ring systems.

As indicated above, in one embodiment, $R_1$ includes a polyether. As generally known in the art, such polyethers are compounds having at least one ether group. In this regard, the $R_1$ polyether may be a $C_2$ polyether, a $C_3$ polyether, or a $C_4$ polyether. For instance, in one embodiment, the polyether may be a polyethylene glycol. In another embodiment, the polyether may be a polypropylene glycol. In an even further embodiment, the polyether may be a polytetramethylene glycol. The polyether may have a weight average molecular weight of about 200 g/mol or more, such as 300 g/mol or more, such as 400 g/mol or more, such as 500 g/mol, such as 750 g/mol or more, such as 1,000 g/mol or more to 10,000 g/mol or less, such as 7,500 g/mol or less, such as 5,000 g/mol or less, such as 4,000 g/mol or less, such as 3,000 g/mol or less, such as 2,500 g/mol or less, such as 2,000 g/mol or less, such as 1,500 g/mol or less, such as 1,250 g/mol or less, such as 1,000 g/mol or less.

The monomer utilized in forming repeating unit (I) may be formed using various techniques. In particular, the monomer utilized in forming repeating unit (I) may be formed by reacting compound (VI) having the following structure:

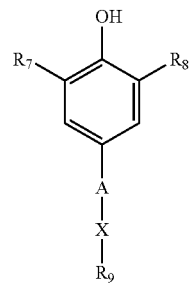

wherein:
A and X are as defined above;
$R_7$ and $R_8$ are each independently hydrogen or a $C_1$-$C_{10}$ alkyl; and
$R_9$ is hydrogen or a $C_1$-$C_5$ alkyl.

In particular, the monomer for repeating unit (I) may be formed by reacting the aforementioned compound (VI) with a compound (VII) having a hydroxyl moiety.

As indicated above, $R_7$ and $R_8$ are each independently hydrogen or a $C_1$-$C_{10}$ alkyl. In one embodiment, $R_7$ and $R_8$ may be different. In another embodiment, however, $R_7$ and $R_8$ may be the same.

In one embodiment, at least one of $R_7$ and $R_8$ may be hydrogen. For instance, in one embodiment, $R_7$ may be hydrogen. In another embodiment, $R_8$ may be hydrogen. In a further embodiment, $R_7$ and $R_8$ may be hydrogen. In a further embodiment, at least one of $R_7$ and $R_8$ may be a $C_1$-$C_{10}$ alkyl. For instance, in one embodiment, $R_7$ may be a $C_1$-$C_{10}$ alkyl. In another embodiment, $R_8$ may be a $C_1$-$C_{10}$ alkyl. In a further embodiment, $R_7$ and $R_8$ may be a $C_1$-$C_{10}$ alkyl. In particular, the alkyl may be a $C_1$-$C_7$ alkyl, such as a $C_1$-$C_6$ alkyl, such as a $C_1$-$C_5$ alkyl, such as a $C_1$-$C_4$ alkyl, such as a $C_2$-$C_4$ alkyl, $C_3$-$C_4$ alkyl, such as a $C_1$-$C_3$ alkyl. In this regard, the alkyl may be heptyl, hexyl, pentyl (e.g., n-pentyl, sec-pentyl, iso-pentyl, tert-pentyl, neo-pentyl), butyl (e.g., n-butyl, sec-butyl, iso-butyl, tert-butyl), propyl (e.g., n-propyl, iso-propyl), etc. In one particular embodiment, the alkyl may be butyl, such as tert-butyl.

As indicated above, $R_9$ is hydrogen or a $C_1$-$C_5$ alkyl. In one embodiment, $R_9$ is hydrogen. In another embodiment, $R_9$ is a $C_1$-$C_5$ alkyl. For instance, the alkyl may be a $C_1$-$C_5$ alkyl, such as a $C_1$-$C_4$ alkyl, such as a $C_1$-$C_3$ alkyl, such as a $C_1$-$C_2$ alkyl, such as a $C_1$ alkyl. In one particular embodiment, the alkyl is a straight chain alkyl.

As indicated above, the monomer for repeating unit (I) may be formed by reacting the aforementioned compound (VI) with a compound (VII) having a hydroxyl moiety. In particular, compound (VII) may be a hydroxyl-substituted $C_1$-$C_{80}$ alkyl, a hydroxyl-substituted $C_2$-$C_{20}$ alkenyl, a hydroxyl-substituted $C_2$-$C_{20}$ alkynyl, a hydroxyl-substituted $C_3$-$C_{12}$ aryl, or a hydroxyl-terminated polyether.

In one embodiment, compound (VII) may be a hydroxyl-substituted $C_1$-$C_{80}$ alkyl. In another embodiment, compound (VII) may be a hydroxyl-substituted $C_2$-$C_{20}$ alkenyl. In a further embodiment, compound (VII) may be a hydroxyl-substituted $C_2$-$C_{20}$ alkynyl. In an even further embodiment, compound (VII) may be a hydroxyl-substituted $C_3$-$C_{12}$ aryl. In another embodiment, compound (VII) may be a hydroxyl-terminated polyether.

As indicated above, in one embodiment, compound (VII) may be a hydroxyl-substituted $C_1$-$C_{80}$ alkyl. In this regard, the alkyl may be a $C_1$-$C_{80}$ alkyl, such as a $C_3$-$C_{80}$ alkyl, such as a $C_4$-$C_{70}$ alkyl, such as a $C_5$-$C_{60}$ alkyl, such as a $C_6$-$C_{50}$ alkyl, such as a $C_8$-$C_{40}$ alkyl, such as a $C_{10}$-$C_{30}$ alkyl, such as a $C_{12}$-$C_{26}$ alkyl, such as a $C_{14}$-$C_{24}$ alkyl, such as a $C_{16}$-$C_{22}$ alkyl. In addition, the alkyl may be a $C_1$-$C_{80}$ alkyl, such as a $C_{10}$-$C_{80}$ alkyl, such as a $C_{20}$-$C_{80}$ alkyl, such as a $C_{30}$-$C_{80}$ alkyl. For instance, the alkyl may have 1 or more, such as 2 or more, such as 3 or more, such as 4 or more, such as 5 or more, such as 6 or more, such as 8 or more, such as 10 or more, such as 11 or more, such as 12 or more, such as 14 or more, such as 16 or more, such as 18 or more, such as 20 or more, such as 24 or more carbon atoms. The alkyl may have 80 or less, such as 70 or less, such as 60 or less, such as 50 or less, such as 40 or less, such as 30 or less, such as 26 or less, such as 24 or less, such as 20 or less, such as 18 or less, such as 16 or less carbon atoms. In addition, the alkyl may be a straight chain, a branched chain, or cyclic. In one embodiment, the alkyl is a straight chain. In another embodiment, the alkyl is a branched chain. In a further embodiment, the alkyl is cyclic.

As indicated above, in one embodiment, the alkyl may be a branched chain alkyl. In this regard, compound (VII) may be a branched, saturated alcohol, such as a Guerbet alcohol. As generally known in the art, Guerbet alcohols are saturated primary alcohols with branching of the carbon chain. In this regard, such alcohols may be described as 2-alkyl-1-alkanols. Without being limited, these alcohols may include, but are not limited to, 2-butyl hexanol, 2-butyl octanol, 2-butyl decanol, 2-butyl dodecanol, 2-butyl tetradecanol, 2-butyl hexadecanol, 2-butyl octadecanol, 2-hexyl hexanol, 2-hexyl octanol, 2-hexyl decanol, 2-hexyl dodecanol, 2-hexyl tetradecanol, 2-hexyl hexadecanol, 2-hexyl octadecanol, 2-octyl hexanol, 2-octyl octanol, 2-octyl decanol, 2-octyl dodecanol, 2-octyl tetradecanol, 2-octyl hexadecanol, 2-octyl octadecanol, 2-decyl hexanol, 2-decyl octanol, 2-decyl decanol, 2-decyl dodecanol, 2-decyl tetradecanol, 2-decyl hexadecanol, 2-decyl octadecanol, 2-dodecyl hexanol, 2-dodecyl octanol, 2-dodecyl decanol, 2-dodecyl dodecanol, 2-dodecyl tetradecanol, 2-dodecyl hexadecanol, 2-dodecyl octadecanol, 2-tetradecyl hexanol, 2-tetradecyl octanol, 2-tetradecyl decanol, 2-tetradecyl dodecanol, 2-tetradecyl tetradecanol, 2-tetradecyl hexadecanol, and 2-tetradecyl octadecanol.

As indicated above, in one embodiment, compound (VII) may be a hydroxyl-substituted $C_2$-$C_{20}$ alkenyl. In this regard, the alkenyl may be a $C_2$-$C_{20}$ alkenyl, such as a $C_4$-$C_{20}$ alkenyl, such as a $C_6$-$C_{20}$ alkenyl, such as a $C_{10}$-$C_{20}$ alkenyl, such as a $C_{12}$-$C_{20}$ alkenyl, such as a $C_{14}$-$C_{20}$ alkenyl, such as a $C_{14}$-$C_{18}$ alkenyl. For instance, the alkenyl may have 2 or more, such as 3 or more, such as 4 or more, such as 5 or more, such as 6 or more, such as 8 or more, such as 10 or more, such as 12 or more, such as 14 or more, such as 16 or more carbon atoms. The alkenyl may have 20 or less, such as 18 or less, such as 16 or less carbon atoms, such as 14 or less, such as 12 or less, such as 10 or less, such as 8 or less, such as 6 or less carbon atoms. In addition, the alkenyl may be a straight chain or a branched chain. In one embodiment, the alkenyl is a straight chain. In another embodiment, the alkenyl is a branched chain.

As indicated above, in one embodiment, compound (VII) may be a hydroxyl-substituted $C_2$-$C_{20}$ alkynyl. In this regard, the alkynyl may be a $C_2$-$C_{20}$ alkynyl, such as a $C_4$-$C_{20}$ alkynyl, such as a $C_6$-$C_{20}$ alkynyl, such as a $C_{10}$-$C_{20}$ alkynyl, such as a $C_{12}$-$C_{20}$ alkynyl, such as a $C_{14}$-$C_{20}$ alkynyl, such as a $C_{14}$-$C_{18}$ alkynyl. For instance, the alkynyl may have 2 or more, such as 3 or more, such as 4 or more, such as 5 or more, such as 6 or more, such as 8 or more, such as 10 or more, such as 12 or more, such as 14 or more, such as 16 or more carbon atoms. The alkynyl may have 20 or less, such as 18 or less, such as 16 or less carbon atoms, such as 14 or less, such as 12 or less, such as 10 or less, such as 8 or less, such as 6 or less carbon atoms. In addition, the alkynyl may be a straight chain or a branched chain. In one embodiment, the alkynyl is a straight chain. In another embodiment, the alkynyl is a branched chain.

As indicated above, in one embodiment, compound (VII) may be a hydroxyl-substituted $C_3$-$C_{12}$ aryl. In this regard, the aryl may be a $C_3$-$C_{12}$ aryl, such as a $C_4$-$C_{12}$ aryl, such as a $C_6$-$C_{12}$ aryl, such as a $C_6$-$C_{10}$ aryl, such as a $C_6$—$C$ aryl. For instance, the aryl may have 3 or more, such as 4 or more, such as 5 or more, such as 6 or more carbon atoms. The aryl may have 12 or less, such as 10 or less, such as 8 or less, such as 7 or less, such as 6 or less, such as 5 or less carbon atoms. In addition, in one embodiment, the aryl may be polycyclic. The polycyclic aryl may include fused, bridged, and spiro ring systems.

As indicated above, in one embodiment, compound (VII) may be a hydroxyl-terminated polyether. As generally known in the art, such polyethers are compounds having at least one ether group. In this regard, the polyether may be a $C_2$ polyether, a $C_3$ polyether, or a $C_4$ polyether. For instance, in one embodiment, the polyether may generally be a polyalkylene glycol. In one embodiment, the polyalkylene glycol may be a polyethylene glycol. In another embodiment, the polyalkylene glycol may be a polypropylene glycol. In an even further embodiment, the polyalkylene glycol may be a polytetramethylene glycol. In particular, the polyether may be a monoalkyl polyalkylene glycol. These may include a monomethyl polyethylene glycol to provide a polyethylene glycol, a monomethyl polypropylene glycol to provide a polypropylene glycol, or a monomethyl polytetramethylene glycol to provide a polytetramethylene glycol.

The polyether may have a weight average molecular weight of about 200 g/mol or more, such as 300 g/mol or more, such as 400 g/mol or more, such as 500 g/mol, such as 750 g/mol or more, such as 1,000 g/mol or more to 10,000 g/mol or less, such as 7,500 g/mol or less, such as 5,000 g/mol or less, such as 4,000 g/mol or less, such as 3,000 g/mol or less, such as 2,500 g/mol or less, such as 2,000 g/mol or less, such as 1,500 g/mol or less, such as 1,250 g/mol or less, such as 1,000 g/mol or less.

In general, compound (VI) may be a substituted dialkylphenol, for example wherein the substitution is at the position ortho to the hydroxyl group. In particular, compound (VI) may be a substituted di-tert-butylphenol, such as a substituted 2,6-di-tert-butylphenol. Furthermore, compound (VI) may undergo a dealkylation/deprotection step and a transesterification for producing the monomer of repeating unit (I). To form the monomer, compound (VI) may be first deprotected and then undergo transesterification, or alternatively compound (VI) may first undergo transesterification and then be deprotected.

Such deprotection and transesterification reactions may be conducted according to conditions generally employed in the art. For instance, the deprotection reaction may be conducted in a liquid phase. The liquid may be an organic liquid and is not necessarily limited by the present invention. For instance, the liquid may be xylenes. The deprotection reaction may also be conducted in the presence of an acid, such as a strong organic acid. As an example, the acid may include a sulfonic acid, such as a toluenesulfonic acid. The deprotection reaction may be conducted at a temperature greater than room temperature, such as 25° C. or more, such as 50° C. or more, such as 75° C. or more, such as 100° C. or more, such as 125° C. or more, such as 140° C. or more.

The reaction may also be conducted in the presence of an inert gas, such as argon and/or nitrogen.

The transesterification reaction may be conducted under basic conditions. For instance, a base may be added to the reaction mixture including compound (VI) and compound (VII). In particular, the base may be a strong base. The base may be potassium hydroxide, sodium hydroxide, lithium hydroxide, or a combination thereof. The addition of such base may be at a temperature greater than room temperature, such as 25° C. or more, such as 40° C. or more, such as 50° C. or more, such as 60° C. or more, such as 70° C. or more. Upon adding the base, the transesterification reaction may be conducted at a temperature greater than room temperature, such as 25° C. or more, such as 50° C. or more, such as 75° C. or more, such as 100° C. or more, such as 125° C. or more, such as 150° C. or more. The transesterification reaction may be conducted under vacuum.

Such deprotection and transesterification reactions may yield compound (VIII) having the following structure:

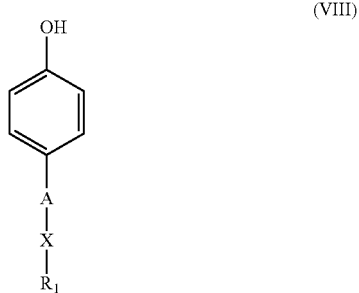

(VIII)

wherein:

A, X, and $R_1$ are as defined above.

While the aforementioned may describe a manner for forming the repeating unit (I), it should be understood that other methods generally known in the art may also be utilized for forming repeating unit (I).

Turning to repeating unit (II), as indicated above, $R_2$ is a $C_1$-$C_{80}$ alkyl. In this regard, $R_2$ may be a $C_1$-$C_{80}$ alkyl, such as a $C_2$-$C_{80}$ alkyl, such as a $C_3$-$C_{80}$ alkyl, such as a $C_4$-$C_{70}$ alkyl, such as a $C_5$-$C_{60}$ alkyl, such as a $C_6$-$C_{50}$ alkyl, such as a $C_8$-$C_{40}$ alkyl, such as a $C_{10}$-$C_{30}$ alkyl, such as a $C_{12}$-$C_{26}$ alkyl, such as a $C_{14}$-$C_{24}$ alkyl, such as a $C_{16}$-$C_{22}$ alkyl. In addition, the $R_2$ alkyl may be a $C_1$-$C_{80}$ alkyl, such as a $C_{10}$-$C_{80}$ alkyl, such as a $C_{20}$-$C_{80}$ alkyl, such as a $C_{30}$-$C_{80}$ alkyl. For instance, the $R_2$ alkyl may have 1 or more, such as 2 or more, such as 3 or more, such as 4 or more, such as 5 or more, such as 6 or more, such as 8 or more, such as 10 or more, such as 11 or more, such as 12 or more, such as 13 or more, such as 14 or more, such as 16 or more, such as 18 or more, such as 20 or more, such as 24 or more carbon atoms. The $R_2$ alkyl may have 80 or less, such as 70 or less, such as 60 or less, such as 50 or less, such as 40 or less, such as 30 or less, such as 26 or less, such as 24 or less, such as 20 or less, such as 18 or less, such as 16 or less carbon atoms. In addition, the $R_2$ alkyl may be a straight chain, a branched chain, or cyclic. In one embodiment, the $R_2$ alkyl is a straight chain. In another embodiment, the $R_2$ alkyl is a branched chain. In a further embodiment, the $R_2$ alkyl is cyclic.

In this regard, the monomer for forming repeating unit (II) may be an alkylphenol. In particular, the monomer may be compound (IX) having the following structure:

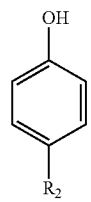

(IX)

wherein:

$R_2$ is as defined above.

Regarding the $R_1$ alkyl, $R_1$ alkenyl, $R_1$ alkynyl, and $R_2$ alkyl, it should be understood that these may also include a distribution. For instance, if $R_1$ includes a distribution of alkyls wherein the $R_1$ alkyl is a $C_q$-$C_r$ alkyl, the $R_1$ group of the copolymer may include other alkyls outside of this range of q to r; however, the average chain length would be from q to r. For example, if the $R_1$ alkyl is a $C_{14}$-$C_{24}$ alkyl, the $R_1$ group of the copolymer may include other alkyls outside of the range of 14 to 24 carbon atoms; however, the average chain length would be between 14 and 24 carbon atoms. Although the $R_1$ alkyl is expressly mentioned in the examples within this paragraph, it should be understood that such also applies to the $R_1$ alkenyl, the $R_1$ alkynyl, and the $R_2$ alkyl.

Turning to the alkylphenol copolymer, as indicated above, "n" is an integer from 1 to 200. In this regard, "n" may be 1 or more, such as 2 or more, such as 3 or more, such as 5 or more, such as 10 or more, such as 20 or more, such as 25 or more, such as 30 or more, such as 40 or more, such as 50 or more, such as 75 or more. In addition, "n" may be 200 or less, such as 175 or less, such as 150 or less, such as 125 or less, such as 100 or less, such as 90 or less, such as 80 or less, such as 75 or less, such as 50 or less, such as 40 or less, such as 30 or less, such as 25 or less.

As indicated above, "m" is an integer from 1 to 400. In this regard, "m" may be 1 or more, such as 2 or more, such as 3 or more, such as 5 or more, such as 10 or more, such as 20 or more, such as 25 or more, such as 30 or more, such as 40 or more, such as 50 or more, such as 75 or more, such as 100 or more, such as 125 or more, such as 150 or more, such as 200 or more. In addition, "m" may be 400 or less, such as 350 or less, such as 300 or less, such as 250 or less, such as 200 or less, such as 175 or less, such as 150 or less, such as 125 or less, such as 100 or less, such as 90 or less, such as 80 or less, such as 75 or less, such as 50 or less, such as 40 or less, such as 30 or less, such as 25 or less.

To help tailor the desired properties of the copolymer for the intended functionality, the balance between the content of the repeating units (I) and (II), as well as their respective molecular weights, may be selectively controlled. For instance, the repeating unit (I) of the copolymer typically constitutes at least 0.1%, such as at least 0.5%, such as at least 1%, such as at least 2%, such as at least 5%, such as at least 10%, such as at least 15%, such as at least 25%, such as at least 40%, such as at least 50% of the repeating units of the copolymer to 98% or less, such as 95% or less, such as 90% or less, such as 80% or less, such as 75% or less, such as 60% or less, such as 50% or less, such as 40% or less, such as 30% or less, such as 20% or less, such as 15% or less, such as 10% or less, such as 8% or less, such as 6% or less of the repeating units of the copolymer. Likewise, the repeating unit (II) of the copolymer typically constitutes at least 1%, such as at least 2%, such as at least 5%, such as at least 10%, such as at least 15%, such as at least 25%, such as at least 30%, such as at least 40%, such as at least 50%, such as at least 60%, such as at least 70%, such as at least 75% of the repeating units of the copolymer to 98% or less, such as 96% or less, such as 94% or less, such as 90% or less, such as 85% or less, such as 80% or less, such as 75% or less, such as 65% or less, such as 60% or less, such as 50% or less, such as 40% or less of the repeating units of the copolymer.

Furthermore, the ratio of the moles of repeating unit (I) to the moles of repeating unit (II) may typically be controlled within a certain range. For instance, the ratio may be 0.001 or more, such as 0.01 or more, such as 0.05 or more, such as 0.1 or more, such as 0.2 or more, such as 0.5 or more, such as 0.6 or more, such as 0.8 or more to 10 or less, such as 8 or less, such as 5 or less, such as 4 or less, such as 3 or less, such as 2.5 or less, such as 2 or less, such as 1.7 or less, such as 1.5 or less, such as 1.4 or less, such as 1.2 or less, such as 1 or less.

The number average molecular weight of the repeating unit (I) may be about 300 Daltons or more, such as about 500 Daltons or more, such as about 1,000 Daltons or more, such as about 2,000 Daltons or more, such as about 4,000 Daltons or more. The number average molecular weight of the repeating unit (I) may be about 25,000 Daltons or less, such as about 20,000 Daltons or less, such as about 15,000 Daltons or less, such as about 12,000 Daltons or less, such as about 10,000 Daltons or less, such as about 8,000 Daltons or less, such as about 6,000 Daltons or less. The number average molecular weight of the repeating unit (II) may likewise be about 300 Daltons or more, such as about 500 Daltons or more, such as about 1,000 Daltons or more, such as about 2,000 Daltons or more, such as about 4,000 Daltons or more. The number average molecular weight of the repeating unit (II) may be about 25,000 Daltons or less, such as about 20,000 Daltons or less, such as about 15,000 Daltons or less, such as about 12,000 Daltons or less, such as about 10,000 Daltons or less, such as about 8,000 Daltons or less, such as about 6,000 Daltons or less. The number average molecular weight of the entire copolymer may be about 1,000 Daltons or more, such as about 2,000 Daltons or more, such as about 4,000 Daltons or more, such as about 6,000 Daltons or more, such as about 8,000 Daltons or more, such as about 10,000 Daltons or more. The number average molecular weight of the entire copolymer may be about 100,000 Daltons or less, such as about 80,000 Daltons or less, such as about 60,000 Daltons or less, such as about 40,000 Daltons or less, such as about 30,000 Daltons or less, such as about 25,000 Daltons or less, such as about 20,000 Daltons or less, such as about 15,000 Daltons or less. The molecular weight may be determined using gel permeation chromatography as described below.

As indicated above, the copolymer includes at least one repeating unit (II). In one embodiment, the repeating unit (II) may comprise a combination of a repeating unit (III) and a repeating unit (IV):

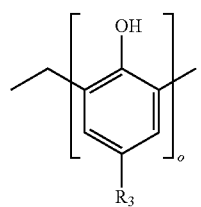

(III)

(IV)

wherein:
$R_3$ is a $C_1$-$C_{15}$ alkyl;
$R_4$ is a $C_2$-$C_{80}$ alkyl, wherein $R_3$ and $R_4$ are different;
o is an integer from 1 to 200; and
p is an integer from 1 to 200.

As indicated above, $R_3$ is a $C_1$-$C_{15}$ alkyl. In this regard, the $R_3$ alkyl may be a $C_1$-$C_{15}$ alkyl, such as a $C_2$-$C_{14}$ alkyl, such as a $C_6$-$C_{14}$ alkyl, such as a $C_8$-$C_{14}$ alkyl, such as a $C_{10}$-$C_{14}$ alkyl. For instance, the $R_3$ alkyl may have 1 or more, such as 2 or more, such as 3 or more, such as 4 or more, such as 5 or more, such as 6 or more, such as 8 or more, such as 10 or more, such as 12 or more carbon atoms. The $R_3$ alkyl may have 15 or less, such as 14 or less, such as 13 or less, such as 12 or less, such as 10 or less carbon atoms. In addition, the $R_3$ alkyl may be a straight chain, a branched chain, or cyclic. In one embodiment, the $R_3$ alkyl is a straight chain. In another embodiment, the $R_3$ alkyl is a branched chain. In a further embodiment, the $R_3$ alkyl is cyclic.

As indicated above, $R_4$ is a $C_2$-$C_{80}$ alkyl, wherein $R_3$ and $R_4$ are different. In this regard, the $R_4$ alkyl may be a $C_2$-$C_{80}$ alkyl, such as a $C_3$-$C_{80}$ alkyl, such as a $C_4$-$C_{70}$ alkyl, such as a $C_5$-$C_{60}$ alkyl, such as a $C_6$-$C_{50}$ alkyl, such as a $C_8$-$C_{40}$ alkyl, such as a $C_{10}$-$C_{30}$ alkyl, such as a $C_{12}$-$C_{26}$ alkyl, such as a $C_{14}$-$C_{24}$ alkyl, such as a $C_{16}$-$C_{22}$ alkyl. In addition, the $R_4$ alkyl may be a $C_2$-$C_{80}$ alkyl, such as a $C_{10}$-$C_{80}$ alkyl, such as a $C_{20}$-$C_{80}$ alkyl, such as a $C_{30}$-$C_{80}$ alkyl. For instance, the $R_4$ alkyl may have 2 or more, such as 3 or more, such as 4 or more, such as 5 or more, such as 6 or more, such as 8 or more, such as 10 or more, such as 11 or more, such as 12 or more, such as 13 or more, such as 14 or more, such as 16 or more, such as 18 or more, such as 20 or more, such as 24 or more carbon atoms. The $R_4$ alkyl may have 80 or less, such as 70 or less, such as 60 or less, such as 50 or less, such as 40 or less, such as 34 or less, such as 30 or less, such as 26 or less, such as 24 or less, such as 20 or less, such as 18 or less, such as 16 or less carbon atoms. In addition, the $R_4$ alkyl may be a straight chain, a branched chain, or cyclic. In one embodiment, the $R_4$ alkyl is a straight chain. In another embodiment, the $R_4$ alkyl is a branched chain. In a further embodiment, the $R_4$ alkyl is cyclic.

As indicated above, $R_3$ and $R_4$ include an alkyl wherein $R_3$ and $R_4$ are different. In this regard, the alkyls may contain a different number of carbon atoms. For instance, one alkyl may contain 1 or more, such as 2 or more, such as 3 or more, such as 4 or more, such as 5 or more, such as 8 or more, such as 10 or more carbon atoms than the other alkyl. In particular, in one embodiment, the $R_4$ alkyl may contain 1 or more, such as 2 or more, such as 3 or more, such as 4 or more, such as 5 or more, such as 8 or more, such as 10 or more carbon atoms than the $R_3$ alkyl.

Regarding the $R_3$ alkyl and $R_4$ alkyl, it should be understood that these may also include a distribution. For instance, if $R_3$ includes a distribution of alkyls wherein the $R_3$ alkyl is a $C_q$-$C_r$ alkyl, the $R_3$ group of the copolymer may include other alkyls outside of this range of q to r; however, the average chain length would be from q to r. For example, if the $R_3$ alkyl is a $C_{14}$-$C_{24}$ alkyl, the $R_3$ group of the copolymer may include other alkyls outside of the range of 14 to 24 carbon atoms; however, the average chain length would be between 14 and 24 carbon atoms. Although the $R_3$ alkyl is expressly mentioned in the examples within this paragraph, it should be understood that such also applies to the $R_4$ alkyl.

As indicated above, "o" is an integer from 1 to 200. In this regard, "o" may be 1 or more, such as 2 or more, such as 3 or more, such as 5 or more, such as 10 or more, such as 20 or more, such as 25 or more, such as 30 or more, such as 40 or more, such as 50 or more, such as 75 or more. In addition, "o" may be 200 or less, such as 175 or less, such as 150 or less, such as 125 or less, such as 100 or less, such as 90 or less, such as 80 or less, such as 75 or less, such as 50 or less, such as 40 or less, such as 30 or less, such as 25 or less, such as 20 or less.

As indicated above, "p" is an integer from 1 to 200. In this regard, "p" may be 1 or more, such as 2 or more, such as 3 or more, such as 5 or more, such as 10 or more, such as 20 or more, such as 25 or more, such as 30 or more, such as 40 or more, such as 50 or more, such as 75 or more. In addition, "p" may be 200 or less, such as 175 or less, such as 150 or less, such as 125 or less, such as 100 or less, such as 90 or less, such as 80 or less, such as 75 or less, such as 50 or less, such as 40 or less, such as 30 or less, such as 25 or less, such as 20 or less.

In addition to controlling the ratio of repeating units (I) and (II), the ratio of repeating units (III) and (IV) may also be controlled. For instance, the repeating unit (III) of the copolymer typically constitutes at least 10%, such as at least 20%, such as at least 25%, such as at least 30%, such as at least 40%, such as at least 50%, such as at least 60% to 95% or less, such as 90% or less, such as 80% or less, such as 75% or less, such as 70% or less, such as 65% or less, such as 60% or less, such as 50% or less, such as 40% or less, such as 30% or less, such as 20% or less of the repeating units (II) (i.e., based on the total repeating units (III) and (IV)). Likewise, the repeating unit (IV) of the copolymer typically constitutes at least 10%, such as at least 20%, such as at least 25%, such as at least 30%, such as at least 40%, such as at least 50%, such as at least 60% to 95% or less, such as 90% or less, such as 80% or less, such as 75% or less, such as 70% or less, such as 65% or less, such as 60% or less, such as 50% or less, such as 40% or less, such as 30% or less, such as 20% or less of the repeating units (II) (i.e., based on the total repeating units (III) and (IV)).

Furthermore, the ratio of the moles of repeating unit (III) to the moles of repeating unit (IV) may typically be controlled within a certain range. For instance, the ratio may be 0.01 or more, such as 0.1 or more, such as 0.2 or more, such as 0.5 or more, such as 0.6 or more, such as 0.8 or more to 5 or less, such as 4 or less, such as 3 or less, such as 2.5 or less, such as 2 or less, such as 1.7 or less, such as 1.5 or less, such as 1.4 or less, such as 1.2 or less, such as 1 or less.

The number average molecular weight of the repeating unit (III) may be about 300 Daltons or more, such as about 500 Daltons or more, such as about 1,000 Daltons or more, such as about 2,000 Daltons or more, such as about 4,000 Daltons or more. The number average molecular weight of the repeating unit (III) may be about 20,000 Daltons or less, such as about 15,000 Daltons or less, such as about 12,000 Daltons or less, such as about 10,000 Daltons or less, such as about 8,000 Daltons or less, such as about 6,000 Daltons or less, such as about 4,000 Daltons or less. The number average molecular weight of the repeating unit (IV) may likewise be about 300 Daltons or more, such as about 500 Daltons or more, such as about 1,000 Daltons or more, such as about 2,000 Daltons or more, such as about 4,000 Daltons or more. The number average molecular weight of the repeating unit (IV) may be about 20,000 Daltons or less, such as about 15,000 Daltons or less, such as about 12,000 Daltons or less, such as about 10,000 Daltons or less, such as about 8,000 Daltons or less, such as about 6,000 Daltons or less, such as about 4,000 Daltons or less.

Of course, it should also be understood that other repeating units or constituents may also be present in the copolymer if so desired. For instance, the copolymer may contain another repeating unit (V) that is different than the repeating units (I) and/or (II). When employed such repeating units typically constitute no more than about 20 mol. %, such as no more than about 10 mol. %, such as no more than about 5 mol %, such as no more than about 4 mol % to 0.1 mol % or more, such as 0.2 mol % or more, such as 0.5 mol % or more, such as 0.7 mol % or more, such as 1 mol % or more, such as 2 mol % or more of the copolymer. In one embodiment, the copolymer may not contain another repeating unit (V).

The alkylphenol copolymer may also possess any desired configuration, such as block (diblock, triblock, tetrablock, etc.), random, alternating, graft, star, etc. Nevertheless, the present inventors have discovered that block copolymers are particularly effective for use in the present invention. Without intending to be limited by theory, it is believed that the presence of block oligomer segments can allow larger regions of the repeating units (I) and/or (II) to predominate throughout the polymer chain. This results in a more ordered structure, which can improve various functions of the copolymer. For example, the ordered structure can increase the degree to which the copolymer can nucleate wax crystallization, interact with a paraffinic crystalline or asphaltene surface, thus increasing the percent wax inhibition and decreasing the asphaltene dispersancy parameter as described below. Furthermore, the organized structure is also believed to be more stable at very low temperatures, which can enhance the ability of the resulting composition to flow at such temperatures, such as characterized by the no-flow point and static time to gel. As a result of its highly ordered structure, the polymer typically has a relatively high crystalline melting temperature, such as about 30° C. or more, such as about 40° C. or more, such as about 50° C. to 100° C., such as about 80° C. or less, such as about 60° C. or less. The polymer may also have a relatively low crystallization temperature, such as about 50° C. or less, and in some embodiments, from about 10° C. to about 30° C., as well as a low glass transition temperature, such as about 60° C., and in some embodiments, from about 10° C. to about 55° C. The melting temperature, crystallization temperature, and glass transition temperature may be determined using differential scanning calorimetry (DSC).

The alkylphenol copolymer may be formed using any known polymerization technique as is known in the art. For instance, the techniques may be employed to provide a non-cyclic copolymer. In one embodiment, for example, the monomers used to form the copolymer can be reacted with a formaldehyde source in the presence of a catalyst. Suitable formaldehyde sources may include, for instance, formaldehyde (HCHO), paraform, trioxane, alkylaldehyde, etc. Suitable monomers for forming the repeating units (II) may include butylphenol, nonylphenol, tetracosanylphenol, pentacosanylphenol, hexacosanylphenol, heptacosanylphenol, octacosanylphenol, etc., as well as mixtures thereof. A base or acid catalyst may be employed. Examples of suitable base catalysts include sodium hydroxide, barium hydroxide, potassium hydroxide, calcium hydroxide, organic amines, sodium carbonate, and combinations thereof. Examples of suitable acid catalysts include hydrochloric acid, sulfuric acid, phosphoric acid, sulfonic acid, sulfamido acids, haloacetic acids, and combinations thereof. In particular embodiments, a sulfonic acid catalyst (e.g., p-toluene sulfonic acid or dodecylbenzenesulfonic acid) is employed. The reaction typically occurs at an elevated temperature, such as a temperature of from about 50° C. to about 180° C., and in some embodiments, from about 80° C. to about 120° C.

The manner in which the reaction occurs may depend in part on the type of polymer that is being formed. For example, when forming a random alkylphenol copolymer, the monomers, such as the aforementioned compound (VIII) and compound (IX), may be polymerized together. In addition, the monomers may be reacted with a formaldehyde source. In such embodiments, the ratio of the total number of moles of the formaldehyde source to the total number of moles of the monomers may be about 0.5 or more, such as about 0.6 or more, such as about 0.8 or more, such as 0.9 or more to about 1.2 or less, such as about 1.1 or less, such as about 1.0 or less, such as about 0.95 or less, such as about 0.9 or less, such as about 0.8 or less.

In other cases, it may be desirable to form a block copolymer. In this regard, it may be desirable to initially form a prepolymer prior to completing the polymerization process. For instance, the monomer used to form either of repeating unit (I) or repeating unit (II) may be reacted with a formaldehyde source to form a first oligomer. In particular, the monomer used to form repeating unit (I) may be the aforementioned compound (VIII) while the monomer used to form repeating unit (II) may be the aforementioned compound (IX). Thereafter, the first oligomer may be reacted with the other of compound (VIII) or compound (IX), optionally in the presence of a formaldehyde source. In one embodiment, such reaction may occur in the presence of a formaldehyde source. Alternatively, the other of compound (VIII) or compound (IX) may be reacted with a formaldehyde source to form a second oligomer. Thereafter, the first oligomer and the second oligomer may be reacted, optionally in the presence of a formaldehyde source, to form the alkylphenol copolymer, in particular alkylphenol block copolymer. In one embodiment, such reaction may occur in the presence of a formaldehyde source. In this regard, the ratio of the total number of moles of the formaldehyde source for the formation of the first oligomer to the total number of moles of the monomer (compound (VIII) or compound (IX)) in the first oligomer may range from about 0.5 to about 1, and in some embodiments, from about 0.6 to about 0.85. The ratio of the total number of moles of the formaldehyde source for the formation of the second oligomer (or reacting with first oligomer) to the total number of moles of the monomer (other of compound (VIII) or compound (IX)) may range from about 0.5 to about 1, and in some embodiments, from about 0.6 to about 0.85. The ratio of the total number of moles of the formaldehyde source added for reacting the first oligomer and the second oligomer to the total number of moles of the oligomers may range from about 0.01 to about 0.5, and in some embodiments, from about 0.05 to about 0.2.

Furthermore, it should be understood that the alkylphenol copolymers can be synthesized using various conditions generally utilized in the art. For instance, as one example, reactions may be conducted within a single reaction vessel. Alternatively, as another example, reactions may be conducted using multiple reaction vessels, such as two reaction vessels.

Regardless of the particular manner in which it is formed, the alkylphenol copolymer is typically employed at a concentration of 1 ppm or more, such as 2 ppm or more, such as 5 ppm or more, such as 10 ppm or more, such as 25 ppm or more, such as 50 ppm or more, such as 100 ppm or more, such as 250 ppm or more, such as 500 ppm or more, such as 1,000 ppm or more, such as 2,000 ppm or more, such as 2,500 ppm or more, such as 3,000 ppm or more, such as 5,000 ppm or more to 10,000 ppm or less, such as 9,000 ppm or less, such as 7,500 ppm or less, such as 6,000 ppm or less, such as 5,000 ppm or less, such as 3,000 ppm or less, such as 2,500 ppm or less, such as 2,000 ppm or less, such as 1,500 ppm or less, such as 1,200 ppm or less, such as 1,000 ppm or less, such as 500 ppm or less based on the combined weight of the copolymer and the petroleum source. The petroleum source may be a source of crude oil, another unrefined petroleum source, or a product derived therefrom, such as heating oil, fuel oil, bunker C oil, bitumen, etc.

The particular manner in which the alkylphenol copolymer is added to a petroleum source may vary. If desired, the copolymer may be employed in the form of a concentrated composition that contains the alkylphenol copolymer as the primary ingredient. In other embodiments, the copolymer may be employed in a composition that is in the form of a dispersion or solution that contains one or more solvents in combination with the copolymer. Dilution may occur prior to use, or it may also occur in the field by an end user of the composition.

In this regard, the composition may be a paraffin inhibitor composition and/or an asphaltene dispersant composition. For instance, in one embodiment, the composition may be a paraffin inhibitor composition. In another embodiment, the composition may be an asphaltene dispersant composition. Such compositions may include the copolymer mentioned above and containing both repeating units (I) and (II). In another embodiment, such composition may include a copolymer comprising a second repeating unit in addition to a first repeating unit (I):

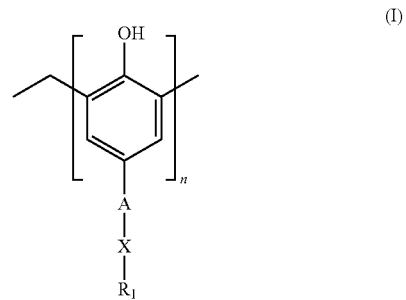

wherein:

A, X, R$_1$, and n are as defined above.

When employing the copolymer in a composition, suitable solvents may include organic solvents, such as aliphatic and/or aromatic hydrocarbons. Particularly suitable solvents include, for instance, petroleum-based solvents that include refined petroleum distillates or solvents. Refined petroleum distillates or solvents may include, for instance, aromatic compounds, such as benzene, toluene, xylene, light aromatic naphtha, heavy aromatic naphtha (HAN), kerosene, etc.; aliphatic compounds, such as pentane, hexane, heptane, octane, nonane, decane, undecane, dodecane, tridecane, tetradecane, pentadecane, hexadecane, etc.; as well as mixtures thereof. Naphtha is a petrochemical industry term describing boiling point fractions of petroleum distillate collected at different points on a distillation column. Naphtha fractions may include linear or branched or cyclic alkanes or alkenes, aromatic hydrocarbons, or fused ring aromatic compounds or mixtures of these materials. Light naphtha is a lower boiling material that is collected near the top portion of the distillation column. Medium naphtha is a higher boiling material that is collected from near the middle of the column. Finally, heavy naphtha is an even higher boiling material that is collected from near the bottom portion of the column. When solvents are employed, they typically constitute 20 wt. % or more, such as 30 wt. % or more, such as 40 wt. % or more, such as 50 wt. % or more, such as 60 wt. % or more to 99 wt. % or less, such as 95 wt. % or less, such as 90 wt. % or less, such as 80 wt. % or less of the composition. Likewise, alkylphenol copolymer(s), such as described herein, may constitute 0.5 wt. % or more, such as 1 wt. % or more, such as 2 wt. % or more, such as 5 wt. % or more, such as 10 wt. % or more to 80 wt. % or less, such as 70 wt. % or less, such as 50 wt. % or less, such as 40 wt. % or less of the composition.

In addition to an alkylphenol copolymer and solvent, the composition may also contain one or more additional ingredients as is known in the art. These ingredients may include corrosion inhibitors, surfactants, neutralizers, stabilizers, plasticizers, biocides, preservatives, etc. Suitable corrosion inhibitors may include, for instance, sulfonates, imidazolines, amines, amides, esters, as well as salts and/or polymers thereof. Examples of amine corrosion inhibitors may include n-tetradecyl amine, n-hexadecylamine, lauryl amine, myristyl amine, palmityl amine, stearyl amine, and oleyl amine, etc. When employed, an additional ingredient may be combined with the alkylphenol copolymer at any point after it is formed. For instance, an additional ingredient may be combined with the copolymer after it is diluted with a solvent or it may be simultaneously added as the copolymer is being formed. Likewise, the additional ingredients may be added at a single point in time or combined with the copolymer in the field to form the composition, such as in response to a certain environmental condition. As an example, one or more additional ingredients may be combined with the alkylphenol copolymer just prior to transportation or storage, or even just prior to the addition of the copolymer to crude oil.

One example of a suitable additional ingredient is a surfactant, which may be employed in an amount of from about 0.1 wt. % to about 10 wt. %, and in some embodiments, from about 0.2 wt. % to about 1 wt. % of the composition. Suitable surfactants may include nonionic surfactants, amphoteric surfactants, and/or anionic surfactants. Examples of suitable nonionic surfactants may include, for instance, alkoxylated alcohols, such as copolymers of ethylene oxide and/or propylene oxide and/or butylene oxide and epoxylated, propoxylated, and epoxylated-propoxylated compounds formed from $C_6$-$C_{40}$ alkanols. Other nonionic surfactants may also be employed, such as alkylphenol alkoxylates (e.g., nonylphenol ethoxylate), block copolymers of ethylene, propylene and butylene oxides, alkyl polyglucosides, polyalkoxylated glycerides, sorbitan esters and polyalkoxylated sorbitan esters, and alkoyl polyethylene glycol esters and diesters. Examples of suitable amphoteric surfactants may include alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, betaines, sultaines, alkyl amphoacetates and amphodiacetates, alkyl amphopropionates and amphodipropionates, dodecylbenzene sulfonic acid, and alkyliminodipropionate. Likewise, examples of suitable anionic surfactants may include alkylbenzene sulfonates, alkyldiphenoxyether sulfonates and disulfonates, napthalene sulfonates, linear and branched alkyl sulfonates, fatty alcohol sulfates, fatty alcohol ether sulfates, linear and branched alpha olefin sulfonates.

Neutralizers may also be employed in the composition if desired. For example, unreacted formaldehyde and/or unused acid catalysts (e.g., dodecylbenzenesulfonic acid) can sometimes remain present within the composition. Unreacted formaldehyde can potentially act as a crosslinking agent that causes unwanted solidification at low temperatures, while unused acid catalysts potentially precipitate as seed crystals at low temperatures. Thus, a base compound may be added to neutralize these components, such as a compound that contains one or more amine moieties (e.g., alkyl amine). Suitable alkyl amines may include monoamines (e.g., methyl amine), diamines (e.g., ethylenediamine), triamines (e.g., diethylenetriamine), etc. When employed, the neutralizer may be added in an amount of from about 0.01 wt. % to about 1 wt. %, and in some embodiments, from about 0.05 wt. % to about 0.5 wt. % of the composition.

When employed, the polymer composition containing the alkylphenol polymer, solvent(s), and other optional components may be combined with a petroleum source in an amount of 1 ppm or more, such as 2 ppm or more, such as 5 ppm or more, such as 10 ppm or more, such as 15 ppm or more, such as 25 ppm or more, such as 50 ppm or more, such as 100 ppm or more, such as 250 ppm or more, such as 500 ppm or more, such as 1,000 ppm or more, such as 2,000 ppm or more, such as 2,500 ppm or more, such as 3,000 ppm or more, such as 5,000 ppm or more to 10,000 ppm or less, such as 9,000 ppm or less, such as 8,000 ppm or less, such as 6,000 ppm or less, such as 5,000 ppm or less, such as 3,000 ppm or less, such as 2,500 ppm or less, such as 2,000 ppm or less, such as 1,800 ppm or less, such as 1,500 ppm or less, such as 1,200 ppm or less, such as 1,000 ppm or less, such as 500 ppm or less based on the combined weight of the petroleum source and the polymer composition. The polymer composition may be added to the petroleum source in a variety of different ways to form a petroleum composition, such as during storage and/or transportation of a petroleum source. For example, the polymer composition may be readily poured or pumped from a storage container or vessel into contact with a petroleum source. The polymer composition can be stored within a container for at least some period of time, removed from the container, and then applied to the petroleum source. The duration of storage may vary from about 1 day to five years, such as about 2 days to 1 year, or about 1 week to 6 months, or about 2 weeks to 4 months, or about 1 to 2 months. The method of applying the polymer composition to the petroleum source is not particularly limited and can be conventionally added by using available equipment, such as pipes, mixers, pumps, tanks, injection ports, etc. In some embodiments, the polymer composition is applied to one or more subterranean hydrocarbon recovery (oil well) locations, such as downhole or on the backside using capillary string, gas lift, slip stream or other methods, at the wellhead, or at any other point downstream of the reservoir. The polymer composition may also be employed in combination with umbilical drilling equipment.

As indicated herein, the alkylphenol copolymer may serve or exhibit various functions, such as an asphaltene dispersant, a paraffin inhibitor, pour point depressant, etc. In addition, the alkylphenol copolymer may be "multi-functional" in that it exhibits two or more beneficial functions (e.g., asphaltene dispersant, paraffin inhibition, and/or viscosity modifier) when used with a petroleum source.

In this regard, in one embodiment, for instance, the copolymer may act as an asphaltene dispersant. In such embodiments, the asphaltene dispersancy parameter of the alkylphenol copolymer may be relatively low, such as about 250 or less, such as about 200 or less, such as about 150 or less, such as about 100 or less, such as about 50 or less, such as about 30 or less, such as about 25 or less, such as about 20 or less, such as about 15 or less. The asphaltene dispersancy parameter of the alkylphenol copolymer may be about 0.1 or more, such as about 0.2 or more, such as about 0.5 or more, such as about 1 or more, such as about 2 or more, such as about 3 or more, such as about 5 or more. The asphaltene dispersancy parameter may be determined in substantial accordance with ASTM D7061-12 at a non-volatile residue percentage that may vary from 5% to 30% (e.g., 15%).

Further, the percent asphaltene inhibition may also be about 50% or more, such as about 60% or more, such as about 70% or more, such as about 80% or more, such as about 90% or more. The percent asphaltene inhibition may be 100% or less, such as 99% or less, such as 98% or less, such as 97% or less, such as 95% or less. The percent asphaltene inhibition may be determined in substantial accordance with ASTM D7061-12 at a non-volatile residue percentage that may vary from 5% to 30% (e.g., 15%).

In addition to acting as an asphaltene dispersant, the alkylphenol copolymer may also function as a paraffin inhibitor. That is, the copolymer may function only as a paraffin inhibitor or it may simultaneously function as an asphaltene dispersant and paraffin inhibitor. In either case, when tested according to the Cold Finger method described herein, the composition can achieve a percent paraffinic wax deposition inhibition of about 50% or more, such as about 55% or more, such as about 60% or more, such as about 70% or more, such as about 80% or more to 100% or less, such as about 99% or less, such as about 97% or less, such as about 95% or less, such as about 93% or less, such as about 90% or less, such as about 85% or less for a given model oil fluid. Without intending to be limited by theory, the ability of the copolymer to function effectively at low temperatures is believed to be at least partially due to its ability to retain good solubility and flow properties at low temperatures. For example, the no-flow point of the copolymer may be relatively low, such as about −20° C. or less, such as about −25° C. or less, such as about −30° C. or less, such as about −40° C. or less to about 70° C. or more, such as about −60° C. or more, such as about −50° C. or more, such as about −40° C. or more when determined in accordance with either ASTM D-7346-15 and at a non-volatile residue percentage that may vary from 5% to 30% (e.g., 15%). In addition to simply performing well at low temperatures, good properties can be maintained at a cold temperature site without risking gel formation over a broad range of temperatures.

The copolymer may also exhibit further beneficial properties indicative of improved performance at low temperatures. For instance, the copolymer may allow for a reduction in the cloud point temperature thereby indicating a reduction in the temperature at which point a sample becomes relatively cloudy and begins to solidify. In this regard, with the copolymer as disclosed herein, the cloud point depression ($\Delta CP$) may be at least 0.5° C., such as at least 1° C., such as at least 1.5° C., such as at least 2° C., such as at least 2.5° C., such as at least 3° C., such as at least 3.5° C., such as at least 4° C. when determined in accordance with ASTM D-5773. The cloud point depression ($\Delta CP$) may be 5° C. or less, such as 4.5° C. or less, such as 4° C. or less, such as 3.5° C. or less, such as 3° C. or less, such as 2.5° C. or less, such as 2° C. or less, such as 1° C. or less when determined in accordance with ASTM D-5773. Such depression may be realized at least at one copolymer dosage of 2000 ppm, 1000 ppm, 500 ppm, or 250 ppm.

Furthermore, the copolymer may also exhibit a reduced pour point thereby indicating a reduction in the temperature at which point the flow characteristics generally diminish. For instance, with the copolymer as disclosed herein, the pour point depression ($\Delta PP$) may be at least 1° C., such as at least 3° C., such as at least 5° C., such as at least 8° C., such as at least 10° C., such as at least 20° C., such as at least 30° C., such as at least 50° C., such as at least 60° C., such as at least 65° C., such as at least 70° C. when determined in accordance with ASTM D-5949. The pour point depression ($\Delta PP$) may be 100° C. or less, such as 90° C. or less, such as 80° C. or less, such as 75° C. or less, such as 70° C. or less, such as 60° C. or less, such as 50° C. or less when determined in accordance with ASTM D-5949. Such depression may be realized at least at one copolymer dosage of 2000 ppm, 1000 ppm, 500 ppm, or 250 ppm.

EXAMPLES

Test Methods

Gel Permeation Chromatography (GPC): The following equipment was used during this test:
Liquid Chromatograph: Agilent 1260 Series Liquid Chromatograph equipped with an Ultraviolet and/or a Refractive Index detector(s), auto-sampler and auto-injector
Cirrus GPC/SEC software v. 3.4.1, Chemstation OpenLab v. C.01.05
In-Line Pre-Column Filter Kit; SSI (Alltech): Filter housing, 35-0148, Replacement Filters, 2.0 µm, 05-0154
Chromatography Columns (Agilent):

| Pore Size(° A) | Dimensions |
|---|---|
| 500 | 300 mm × 7.5 mm × 5 µm |
| $1 \times 10^3$ | 300 mm × 7.5 mm × 5 µm |
| $1 \times 10^4$ | 300 mm × 7.5 mm × 5 µm |
| $1 \times 10^5$ | 300 mm × 7.5 mm × 5 µm |

2 mL glass vials with Teflon lined cap (Hewlett-Packard 5181-3400)
Scintillation Vials: 20 mL, Wheaton 12-986546
Pipets: disposable
50 mL amber dropping bottle
The chromatograph operating parameters were also as follows:
Mobile Phase: 99/1 Tetrahydrofuran/Methanol
Flow: 1.2 mL/min
Injection Volume: 50 µL
UV Detector Wavelength: 280 nm (Samples), 254 nm (Standards)
Peak Threshold: System dependent-high enough to pick up the peaks but not so low that noise is detected
Peak Width: System dependent
Samples: Integration on 10 minutes, processing started before the sample baseline begins to rise (~10.1 minutes). The end processing time is the time of the baseline minimum just before phenol elutes. Phenol is injected in one of the standard sets and is used as a marker, even for samples that do not contain phenol.

Calibration: The chromatograph was calibrated using a series of pure phenols and monodisperse polystyrene standards.

For UV detection, 0.01 g (±0.01) of the sample was weighed into a 20 mL scintillation vial. The vial was filled with 4 mL of the 50 ppm sulfur in a tetrahydrofuran (THF) solution and dissolved. If the sample dissolved completely, it was transferred to a HPLC vial using a dropper pipet. If the sample appears cloudy, it was filtered through a 0.45 µM PTFE syringe filter before being added to the HPLC vial. For RI detection, 0.05 (±0.01) of the sample was weighed into a 20 mL scintillation vial. The vial was filled with 4 mL of the mobile phase currently in use. If the sample dissolved completely, it was transferred to a HPLC vial using a dropper pipet. If the sample appeared cloudy, it was filtered through a 0.45 µM PTFE syringe filter before being added to the HPLC vial. Depending on the reliability of the pump, the standard solutions may be run as often as once every month. With the Cirrus software, each sample has a "Flow Rate Correction Factor", which compared the retention time of the sulfur from the sample run to the sulfur retention time from when the calibration table was created (for UV). If the times matched exactly, the factor was one. If the factor changed significantly, the flow was checked to ensure that the method flow was being obtained. If the flow was correct, the calibration standards were run to update the calibration table. Slight changes in the retention time of the sulfur may occur over time as the columns age, and sulfur shift in the UV detection indicates that recalibration should be performed for both detectors.

Gas Chromatography (GC): Capillary gas chromatography was utilized to determine the reaction progress and amount of intermediates during the reaction. The following was used during this test:

Gas Chromatograph: Hewlett-Packard 7890 equipped with FID Detector or equivalent
HP-5, 30 m×0.32 mm×0.25 um film thickness or equivalent
Tetrahydrofuran, High Purity 99.90%+

The chromatograph operating parameters were also as follows:
Carrier Gas: Helium
Pressure: 9.5411 psi
Gas Saver: Off
Injection Port Temperature: 250° C.
Detector Temperature: 300° C.
Column Oven Temperature: 50° C. initial temperature 50° C. to 300° C. at 20° C./min and hold for 15 minutes
Injection Type: Split
Split Vent Flow: 40 mL/min
Injection Volume: 1.0 µL For instrument calibration, a solvent blank injection was made. The solvent blank was run to verify the purity of the THF solvent and to confirm the GC system is free from contamination. The resulting chromatogram was examined for extraneous peaks that may interfere with the peaks for the actual sample components. If contamination existed, the following steps were performed: clean the syringe; prepare a new solvent blank; if using an autosampler, replace the rinse solvent; and make/examine another solvent blank injection.

For sample preparation, 200 mg of sample were dissolved in 25 mL of THF. Then, 1.0 µL of the sample solution was injected.

For chromatogram analysis, the correct peak assignments were assigned and the peak area percentages are obtained. For example, the elution times for assigning the peaks may be as follows: 2,6-di-tert-butylphenol is approximately 6.9 minutes, n-octadecyl 4-hydroxyhydrocinnamate is approximately 19.8 minutes, and methyl 3,5-di-tert-butyl-4-hydroxyhydrocinnamate is approximately 9.6 minutes. Having assigned the peaks and obtained the peak area percentages, the percent purity and/or relative amounts of reactants/products can be determined using direct area percent normalization.

Example 1

The examples below demonstrate the synthesis of various monomers that can form repeating unit (I) as well as the synthesis of a copolymer as described herein.

Example 1-A

Synthesis of n-octadecyl 4-hydroxyhydrocinnamate

A 250 mL 4-neck flask equipped with an overhead stirrer and condenser was charged with n-octadecyl 3,5-di-tert-butyl-4-hydroxyhydrocinnamate (100 g, 0.188 mol), xylenes (40.0 g), and aqueous 66 wt % para-toluenesulfonic acid (3.00 g, 0.0116 mol). The contents of the reaction flask were swept with a slow stream of nitrogen and heated under reflux at 145° C. The progress of the reaction was monitored by gas chromatography (GC). After 12 hours, the distribution of products were found to be an almost equal mixture of n-octadecyl 4-hydroxyhydrocinnamate (48%) and with n-octadecyl 3-tert-butyl-4-hydroxyhydrocinnamate (52%). After 16 hours the reaction mixture was cooled to room temperature, which upon standing overnight produced a solid mass. The solid mass was treated with heptane (40.0 g) and stirred. The suspended solids were collected by vacuum filtration, washed with heptane, and dried to give 28.9 g of a white microcrystalline product of n-octadecyl 4-hydroxyhydrocinnamate. An additional 6.0 g of product was collected from the mother liquor. This example serves to demonstrate that deprotection occurring after a transesterification step of the methyl 3,5-di-tert-butyl-4-hydroxyhydrocinnamate provides access to a phenol suitable for condensation with a source of formaldehyde.

Example 1-B

Condensation Polymer of n-octadecyl 4-hydroxyhydrocinnamate with Formaldehyde

A 125 mL 3-neck flask equipped with an overhead stirrer and condenser was charged with n-octadecyl 4-hydroxyhydrocinnamate (Example 1) (17.0 g, 0.0406 mol), heptane (50.0 g), 3 drops of dodecylbenzenesulfonic acid, paraform (0.964 g, 0.0321 mol) and the mixture was brought to a steady reflux at 90° C. After being held at 90° C. for 2 hours, the reaction was switched to distillation and water was removed azeotropically. The reaction mixture was sampled for molecular weight analysis using GPC to give a polymer of approximately 3500 Da. The reaction mixture was switched back to reflux and treated with another 0.100 g of paraform. After being held for an hour at reflux, the reaction was switched to distill to remove water azeotropically. The reaction mixture was sampled for molecular weight analysis using GPC to give a polymer of approximately 6700 Da. Two additional post-additions of paraform (0.0500 g) were completed following the same 2 hour reflux and then distillation process. The reaction mixture was sampled for molecular weight analysis after each post-addition using GPC to give polymers of approximately 8900 Da and 9400 Da, respectively. This example serves to demonstrate that the deprotection product produced in Example 1 readily reacts with a source of formaldehyde to produce a condensation polymer product.

Example 1-C

Synthesis of Methyl 4-hydroxyhydrocinnamate

A 250 mL 4-neck flask equipped with an overhead stirrer and condenser was charged with methyl 3,5-di-tert-butyl-4-hydroxyhydrocinnamate (120 g, 0.410 mol), xylenes (45.0 g), and aqueous 66 wt % para-toluenesulfonic acid (12.0 g, 0.0460 mol). The contents of the reaction flask were swept with a slow stream of nitrogen and heated to 145-150° C. and the water was removed using a moisture trap. The progress of the reaction was monitored by gas chromatography (GC). After 16 hours, 4-hydroxyhydrocinnamate was the major product (82% of total). The product was vacuum distilled at 9 Torr between 178-182° C. to give 31.9 g of methyl 4-hydroxyhydrocinnamate as a light yellow oil that contained 8% of methyl 3-tert-butyl-4-hydroxyhydrocinnamate. This example serves to demonstrate that deprotection of the methyl 3,5-di-tert-butyl-4-hydroxyhydrocinnamate occurs and provides access to a phenol that can be isolated and used in subsequent reaction steps such as transesterification with a suitable alcohol.

Example 1-D

Synthesis of Decyltetradecyl-4-hydroxyhydrocinnamate

A 250 mL 4-neck flask equipped with an overhead stirrer and condenser was charged with methyl 3,5-di-tert-butyl-4-hydroxyhydrocinnamate (100 g, 0.342 mol), xylenes (40.0 g), and aqueous 66 wt % para-toluenesulfonic acid (3.45 g, 0.0132 mol). The contents of the reaction flask were swept with a slow stream of nitrogen and heated to 130° C. and held. The progress of the reaction was monitored by gas chromatography (GC). After 12 hours, the major component was identified as being 90% of the product distribution. After cooling to the mixture to room temperature, the flask was charged with 2-decyltetradecyl alcohol. The reaction flask was set up for vacuum distillation and distilled up to 120° C. at 28 inHg to remove xylenes and residual amounts of water. After this distillation step, the mixture was cooled to 70° C. and treated with the dropwise addition of KOH (45%, 1.75 g, 0.0150 mol). During the addition of KOH the reaction mixture became opaque and viscous at the endpoint of the addition. The opaque appearance disappeared upon further stirring. After which point, the reaction mixture was charged with LiOH (50.0 mg, 2.09 mmol) followed by 5 mL of water to homogenize the LiOH in the mixture. The mixture was then heated up to 160° C. under vacuum (28 inHg) for 5 hours followed by 90 minutes at 165° C. before cooling the mixture down to 80° C. Once at 80° C., the mixture was treated with 50 mL of $H_2O$ and 5 mL of glacial acetic acid and then heated to 110° C. with stirring. The layers were then allowed to separate after stirring was stopped and cool down to 80° C. The bottom aqueous layer was removed. The washing process was repeated once more and then residual $H_2O$ and AcOH were removed by vacuum distillation up to 130° C. at 29 (mmHg) and holding for 30 min at 130° C. The intermediate product was isolated as a dark viscous fluid (174.2 g). The product was identified as mixture of decyltetradecyl 3-tert-butyl-4-hydroxyhydrocinnamate (85%) and decyltetradecyl-4-hydroxyhydrocinnamate (15%). The dark viscous liquid was transferred into a 3 neck round bottom flask, treated with xylenes (45 g) and aqueous 66 wt % para-toluenesulfonic acid (12.0 g, 0.0460 mol) and then heated under reflux at 150° C. The progress of the reaction was monitored using GC and was heated until decyltetradecyl-4-hydroxyhydrocinnamate comprised greater than 98% of the 4-hydroxyhydrocinnamate composition. The mixture was cooled down to 80° C. Once at 80° C., the mixture was treated with 50 mL of $H_2O$ and 5 mL of glacial acetic acid and then heated to 110° C. with stirring. The layers were then allowed to separate after stirring was stopped and cool down to 80° C. The bottom aqueous layer was removed. The washing process was repeated twice and then residual $H_2O$ and AcOH were removed by vacuum distillation up to 130° C. at 29 (mmHg) and holding for 30 min at 130° C. to give decyltetradecyl-4-hydroxyhydrocinnamate as a brown viscous liquid (124.8 g). This example serves to demonstrate that incomplete deprotection of methyl 3,5-di-tert-butyl-4-hydroxyhydrocinnamate can be completely transesterified with a suitable alcohol and then this intermediate can be further reacted to remove the remaining tert-butyl protecting groups to provide access to a transesterified phenol suitable for condensation with a source of formaldehyde.

Example 1-E

Copolymer of Long Chain Alkylphenol with 30+ Carbon Alkyl (LCAP30+) and decyltetradecyl-4-hydroxyhydrocinnamate with Formaldehyde A four-neck 250 ml flask equipped with overhead stirring, a condenser, a nitrogen inlet, and an addition funnel was charged with 1.0 molar equivalents LCAP30+, 1.0 molar equivalents of decyltetradecyl-4-hydroxyhydrocinnamate, and 0.002 molar equivalents of dodecyl-benzyl-sulfonic acid and then heated to a temperature from about 80° C. to about 95° C. Once at temperature, 37% aqueous formaldehyde was loaded into the additional funnel and added to the reaction mixture over 30 minutes, amounting to 0.95 molar equivalents of formaldehyde to the total monomer content. The reaction mixture was brought to reflux between 95-105° C. and held at his temperature for 2 hours. The reaction flask was then fitted with a Dean-Stark trap and the final reaction temperature was set to 135° C. to remove water condensate to give a polymer with a molecular weight of 11,730 Da. This example serves to demonstrate that the deprotected and transesterified product produced in Example 1-D readily reacts with a source of an oligomeric alkyphenol and a source of formaldehyde to produce a condensation copolymer product.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An alkylphenol copolymer comprising the following repeating units (I) and (II):

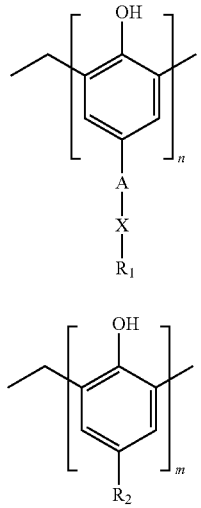

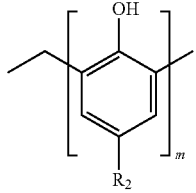

wherein:
A is an alkylene;
X is —C(O)O—, —OC(O)—, —C(O)N($R_6$)—, —N($R_6$)C(O)—, —N($R_6$)—, or —S—;
$R_6$ is H or an alkyl;
$R_1$ includes a $C_1$-$C_{80}$ alkyl, a $C_2$-$C_{20}$ alkenyl, a $C_2$-$C_{20}$ alkynyl, a $C_3$-$C_{12}$ aryl, or a polyether;
$R_2$ is a $C_1$-$C_{80}$ alkyl;
n is an integer from 1 to 200; and
m is an integer from 1 to 400.

2. The alkylphenol copolymer of claim 1, wherein A is a $C_1$-$C_8$ alkylene.

3. The alkylphenol copolymer of claim 1, wherein X is —C(O)O—.

4. The alkylphenol copolymer of claim 1, wherein $R_1$ includes a $C_{10}$-$C_{80}$ alkyl.

5. The alkylphenol copolymer of claim 1, wherein $R_1$ includes a $C_{20}$-$C_{80}$ alkyl.

6. The alkylphenol copolymer of claim 1, wherein $R_1$ includes a polyether.

7. The alkylphenol copolymer of claim 6, wherein the polyether includes a polyethylene glycol.

8. The alkylphenol copolymer of claim 1, wherein n is an integer from 1 to 100.

9. The alkylphenol copolymer of claim 1, wherein the repeating unit (I) comprises from 0.1% to 75% of the repeating units of the alkylphenol copolymer.

10. The alkylphenol copolymer of claim 1, wherein the repeating unit (II) comprises from 25% to 98% of the repeating units of the alkylphenol copolymer.

11. The alkylphenol copolymer of claim 1, wherein the repeating unit (II) comprises a combination of repeating unit (III) and repeating unit (IV):

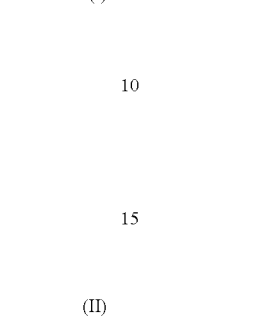

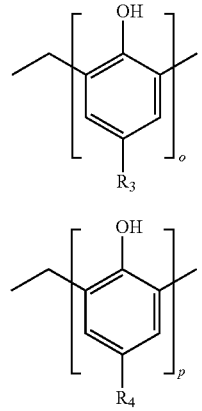

wherein:
$R_3$ is a $C_1$-$C_{15}$ alkyl;
$R_4$ is a $C_2$-$C_{80}$ alkyl, wherein $R_3$ and $R_4$ are different;
o is an integer from 1 to 200; and
p is an integer from 1 to 200.

12. The alkylphenol copolymer of claim 11, wherein $R_3$ is a $C_8$-$C_{14}$ alkyl.

13. The alkylphenol copolymer of claim 11, wherein $R_4$ is a $C_{20}$-$C_{80}$ alkyl.

14. The alkylphenol copolymer of claim 13, wherein $R_4$ includes from 24 to 34 carbon atoms.

15. The alkylphenol copolymer of claim 11, wherein the alkyl of $R_4$ contains 3 or more carbon atoms than the alkyl of $R_3$.

16. The alkylphenol copolymer of claim 11, wherein o and p are independently from 5 to 25.

17. The alkylphenol copolymer of claim 11, wherein the ratio of the moles of the repeating unit (III) to the moles of the repeating unit (IV) is from about 0.2 to about 5.

18. A paraffin inhibitor composition comprising the alkylphenol copolymer of claim 1.

19. An asphaltene dispersant composition comprising the alkylphenol copolymer of claim 1.

20. A petroleum composition comprising the alkylphenol copolymer of claim 1 and a petroleum source.

21. A method for modifying a petroleum source, the method comprising adding the alkylphenol copolymer of claim 1 to a petroleum source.

22. A method for forming the alkylphenol copolymer of claim 1, the method comprising polymerizing compound (VIII), compound (IX), and a formaldehyde source, wherein compound (VIII) and compound (IX) have the following structure:

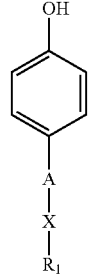

-continued
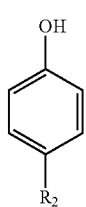
(IX)
wherein:
A is an alkylene;
X is —C(O)O—, —OC(O)—, —C(O)N(R$_6$)—, —N(R$_6$)C(O)—, —N(R$_6$)—, or —S—;
R$_6$ is H or an alkyl;
R$_1$ includes a C$_1$-C$_{80}$ alkyl, a C$_2$-C$_{20}$ alkenyl, a C$_2$-C$_{20}$ alkynyl, a C$_3$-C$_{12}$ aryl, or a polyether; and
R$_2$ is a C$_1$-C$_{80}$ alkyl.
* * * * *